United States Patent
Kang et al.

(10) Patent No.: US 9,088,687 B2
(45) Date of Patent: Jul. 21, 2015

(54) IMAGE SCANNING APPARATUS AND MULTI-FUNCTION APPARATUS INCLUDING THE SAME

(71) Applicant: SAMSUNG ELECTRONICS CO., LTD., Suwon-si, Gyeonggi-do (KR)

(72) Inventors: Jin Gu Kang, Yongin-si (KR); Yun Jeong Jeong, Incheon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/186,682

(22) Filed: Feb. 21, 2014

(65) Prior Publication Data

US 2014/0240801 A1 Aug. 28, 2014

(30) Foreign Application Priority Data

Feb. 28, 2013 (KR) .................. 10-2013-0021673

(51) Int. Cl.
| | |
|---|---|
| *H04N 1/04* | (2006.01) |
| *H04N 1/10* | (2006.01) |
| *H04N 1/12* | (2006.01) |
| *H04N 1/193* | (2006.01) |
| *H04N 1/00* | (2006.01) |

(52) U.S. Cl.
CPC ............. *H04N 1/1065* (2013.01); *H04N 1/103* (2013.01); *H04N 1/1017* (2013.01); *H04N 1/12* (2013.01); *H04N 1/193* (2013.01); *H04N 1/00551* (2013.01); *H04N 2201/0081* (2013.01); *H04N 2201/0442* (2013.01); *H04N 2201/0456* (2013.01)

(58) Field of Classification Search
CPC ... G03G 15/60; G03G 15/80; G03G 21/1652; G03G 2221/166; G03G 9/09708; G03G 9/09716; G03G 9/09725; G03G 2215/00194; H04N 1/00588; H04N 1/00519; H04N 1/00554
See application file for complete search history.

(56) References Cited

U.S. PATENT DOCUMENTS

| | | | | |
|---|---|---|---|---|
| 7,413,838 | B2 * | 8/2008 | Sugiura et al. | 430/108.6 |
| 7,832,726 | B2 * | 11/2010 | Osakabe | 271/261 |
| 7,980,549 | B2 * | 7/2011 | Hamaguchi | 271/118 |
| 8,537,437 | B2 * | 9/2013 | Takeuchi et al. | 358/498 |
| 8,724,191 | B2 * | 5/2014 | Takeuchi et al. | 358/498 |
| 2007/0251056 | A1 * | 11/2007 | Aoyagi | 16/221 |

* cited by examiner

*Primary Examiner* — Negussie Worku
(74) *Attorney, Agent, or Firm* — Staas & Halsey LLP

(57) ABSTRACT

An image scanning apparatus includes a document holder and a scanner module movably installed in the document holder, A multi-function apparatus may further include the image scanning apparatus. While the scanner module passes over the lower side of a document guide provided between a first glass and a second glass provided at the document holder, spacers installed at opposite ends of the scanner module are moved downward by guide members provided at the document guide, thereby preventing spacer portions provided at an upper end of the respective spacers from being caught by the document guide.

27 Claims, 15 Drawing Sheets

IMAGE SCANNING APPARATUS AND MULTI-FUNCTION APPARATUS INCLUDING THE SAME

CROSS-REFERENCE TO RELATED APPLICATIONS

This application claims the priority benefit of Korean Patent Application No. 10-2013-0021673, filed on Feb. 28, 2013 in the Korean Intellectual Property Office, the disclosure of which is incorporated herein by reference.

BACKGROUND

1. Field

Embodiments disclosed herein relate to an image scanning apparatus to scan image information of a document and a multi-function apparatus including the same.

2. Description of the Related Art

Generally, a multi-function apparatus includes an image forming apparatus to form an image on a print medium and an image scanning unit to scan image information of a document.

The image scanning unit may include a document holder in which a document is loaded, a scanner module disposed in the document holder to scan the document loaded on the document holder, and an automatic document feeding unit disposed at the upper side of the document holder to automatically feed a document.

The document holder may include a first glass corresponding to a document fed by the automatic document feeding unit and a second glass corresponding to a document manually loaded on the document holder. The scanner module may be movably installed inside the document holder to scan image information of a document fed by the automatic document feeding unit while being stopped at the lower side of the first glass. Or, the scanner module may be movably installed inside the document holder to scan image information of a document loaded at the upper side of the second glass while moving at the lower side of the second glass.

In recent years, a contact image sensor (CIS) type scanner module has been used as the scanner module. A characteristic of the CIS type scanner module is that it is lightweight.

SUMMARY

It is an aspect of the present invention to provide an image scanning apparatus that prevents damage to spacer portions, which may occur during movement of a scanner module, and a multi-function apparatus including the same.

Additional aspects of the invention will be set forth in part in the description which follows and, in part, will be apparent from the description, or may be learned by practice of the invention.

In accordance with one aspect of the present invention, an image scanning apparatus includes a document holder on which a document may be loaded, a scanner module disposed at a lower side of the document holder, the scanner module extending in a first direction, the scanner module being capable of moving in a second direction perpendicular to the first direction to scan image information from a document loaded on the document holder, an automatic document feeding unit disposed at an upper side of the document holder to automatically feed a document to be scanned, and a pair of spacers disposed at opposite sides of the scanner module in the first direction. The document holder may include a first glass, over which the document fed by the automatic document feeding unit passes, and a second glass, on which a document may be manually loaded. The second glass may be spaced apart from the first glass in the second direction, and a pair of guide members may be provided between the first glass and the second glass, the guide members protruding toward moving routes of the pair of spacers to guide downward movement of the spacers, and each spacer may include a spacer portion protruding from a top thereof such that the spacer portion is supported by or in contact with a bottom of one of the first and second glasses.

At least one of the spacer portions may have an upper end of a predetermined width in the first direction such that the at least one of the spacer portions comes into surface contact with one of the first and second glasses.

At least one of the spacer portions may be formed in an arc shape in a section in the first direction such that the at least one of the spacer portions comes into linear contact with one of the first and second glasses.

At least one of the spacer portions may include a spacer portion provided at one side of the top of a corresponding one of the spacers in the first direction and each guide member may contact the other side of the top of a corresponding one of the spacers in the second direction.

At least one of the spacer portions may include a pair of spacer portions provided in the first direction such that the pair of spacer portions is parallel to each other, for example, in the second direction.

The pair of spacer portions may be provided at one side of the top of a corresponding one of the spacers in the first direction such that the pair of spacer portions is parallel to each other and each guide member may contact the other side of the top of a corresponding one of the spacers in the second direction.

The pair of spacer portions may be provided at opposite sides of the top of a corresponding one of the spacers in the first direction such that the pair of spacer portions is spaced apart from each other and each guide member may contact the top of a corresponding one of the spacers between the pair of spacer portions.

Each guide member may include a roller coming into linear contact with the top of a corresponding one of the spacers.

Each guide member may include a ball coming into point contact with the top of a corresponding one of the spacers.

The image scanning apparatus may further include a document guide disposed between the first glass and the second glass, wherein each guide member may include a guide protrusion integrally protruding from a bottom of the document guide.

The image scanning apparatus may further include a guide rail extending in the first direction, a moving member installed at the guide rail such that the moving member moves in the first direction, and a pair of elastic members installed between the scanner module and the moving member.

In accordance with another aspect of the present invention, a multi-function apparatus includes an image forming apparatus to form an image and an image scanning apparatus disposed on the image forming apparatus to scan image information of a document. The image scanning apparatus may include a document holder on which a document may be loaded, a scanner module disposed at a lower side of the document holder, the scanner module extending in a first direction, the scanner module capable of moving in a second direction perpendicular to the first direction to scan image information from a document on the document holder, an automatic document feeding unit disposed at an upper side of the document holder to automatically feed a document to be scanned, and a pair of spacers disposed at opposite sides of the scanner module in the first direction. The document holder may include a first glass, over which the document fed by the automatic document feeding unit passes, and a second glass, on which a document is manually loaded, the second glass being spaced apart from the first glass in the second direction, and a pair of guide members provided between the first glass and the second glass, the guide members protruding toward moving routes of the pair of spacers to guide downward movement of the spacers, and each spacer may include a spacer portion protruding from a top thereof such that the spacer portion is supported by a bottom of one of the first and second glasses.

In accordance with another aspect of the present invention, an image scanning apparatus includes a scanner module disposed beneath a first glass and a second glass disposed adjacent to the first glass, to move between the first glass and second glass in a first direction, a spacer disposed at an end of the scanner module in a second direction, perpendicular to the first direction, to maintain a predetermined distance between a lower surface of at least one of the first glass and second glass and a top of the scanner module, a spacer portion disposed at an upper portion of the spacer to support at least one of the first glass and second glass, and a guide member disposed between the first glass and second glass to guide downward movement of the spacer.

The image scanning apparatus according may further include a moving member installed on a rail which extends in the first direction, wherein the scanning module may be disposed on the moving member which guides movement of the scanning module in the first direction, and an elastic member disposed between the moving member and the scanner module to elastically support the spacer and the scanner module.

The guide member may move the spacer and scanner module downward when the scanner module moves to a position between the first glass and second glass. The elastic member may be adapted to move the spacer and scanning module upward by an elastic restoring force, after the scanner module moves from a position beneath one of the first glass and the second glass to a position beneath the other one of the first glass and second glass.

The spacer may be formed of lubricating resin.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
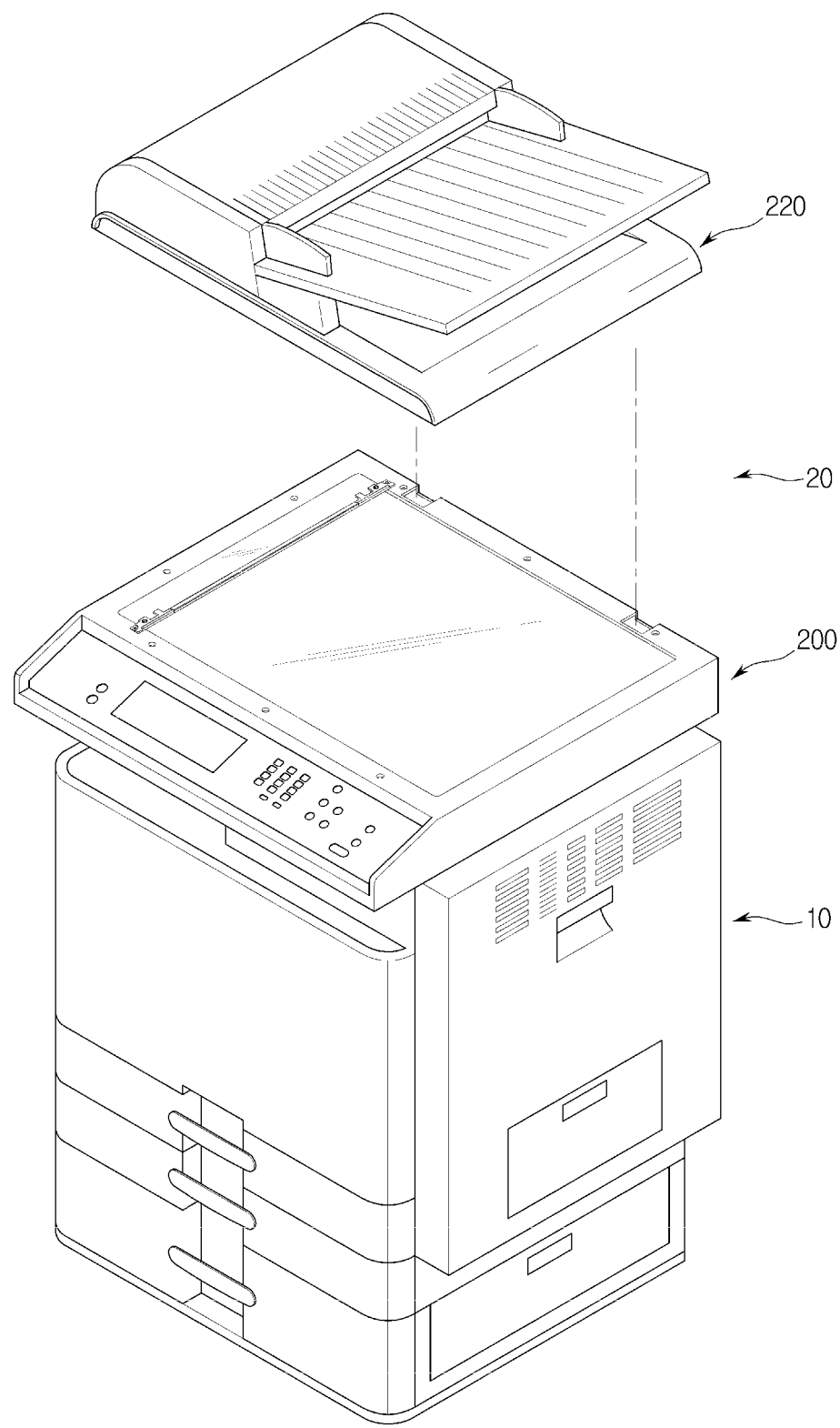
FIG. 1 is a partially exploded perspective view showing a multi-function apparatus according to an embodiment of the present invention.

Reference will now be made in detail to the embodiments of the present invention, examples of which are illustrated in the accompanying drawings, wherein like reference numerals refer to like elements throughout.

As shown in FIG. 1, a multi-function apparatus may include an image forming apparatus 10 to form an image on a print medium and an image scanning apparatus 20. The image scanning apparatus 20 may be physically connected or attached to the image forming apparatus, for example it may be disposed at the upper side of the image forming apparatus 10 to scan image information from a document. The image forming apparatus 10 may include a printer, a copy machine, a fax, or a multifunction device which combines two or more functions of the printer, copy machine, and fax. The image forming apparatus 10 may also include a 3D printer.

As only one example, the image forming apparatus 10 may be embodied generally as a printer which may include a body which houses conventional components of a printer, and the image scanning apparatus 20 may be disposed at an upper portion of the body. For example, the body may include a feeder to store and feed a printing medium, a developer to form an image on the printing medium supplied through the feeder, an optical scanning unit to form an electrostatic latent image on a photosensitive body of the developer, a fuser to fuse a toner image transferred to the printing medium to the printing medium, and a discharge unit to discharge, from the body, the printing medium upon which image formation has been completed. Additionally, the image forming apparatus may have the capability for single-sided printing and/or duplex printing. As another example, the image forming apparatus 10 may be embodied generally as a copier which may include a body which houses conventional components of a copier, or as a facsimile machine, or as a device which performs multiple functions, (for example, of a copier, facsimile machine, and/or printer).

The image scanning apparatus 20 may include a document holder 200 on which a document to be scanned is loaded, a scanner module 210 (see FIG. 2) movably installed at the lower side of the document holder 200 to scan image information from the document loaded on the document holder 200, and an automatic document feeding unit 220 disposed at the upper side of the document holder 200 to cover the document holder 200 and to automatically feed a document to be scanned. The document may include any printing medium (e.g., glossy paper, plain paper, art paper, overhead projector film, and the like).

Figure 2:
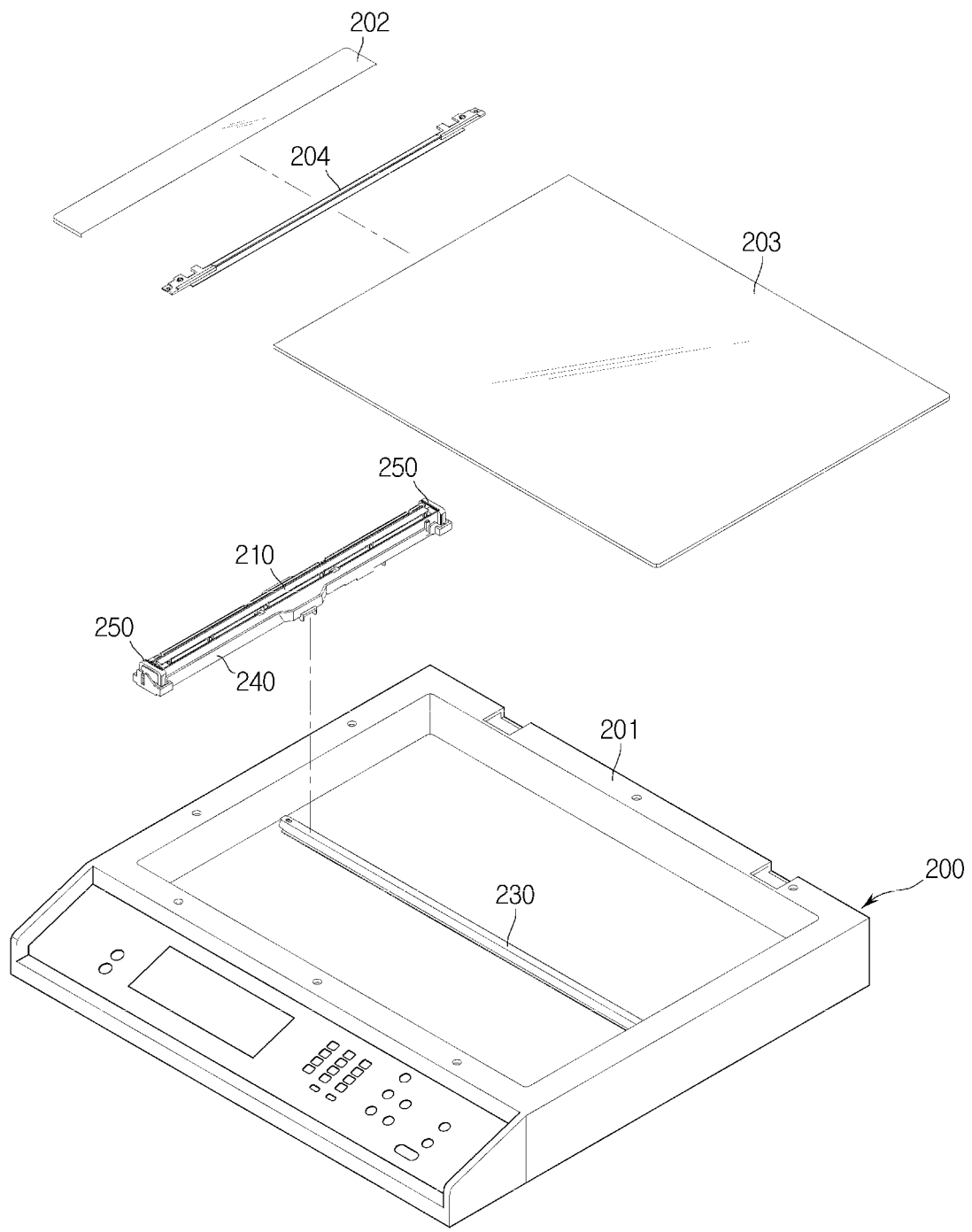
FIG. 2 is an exploded perspective view showing a document holder and a scanner module applied to the multi-function apparatus according to the embodiment of the present invention.
Figure 3:
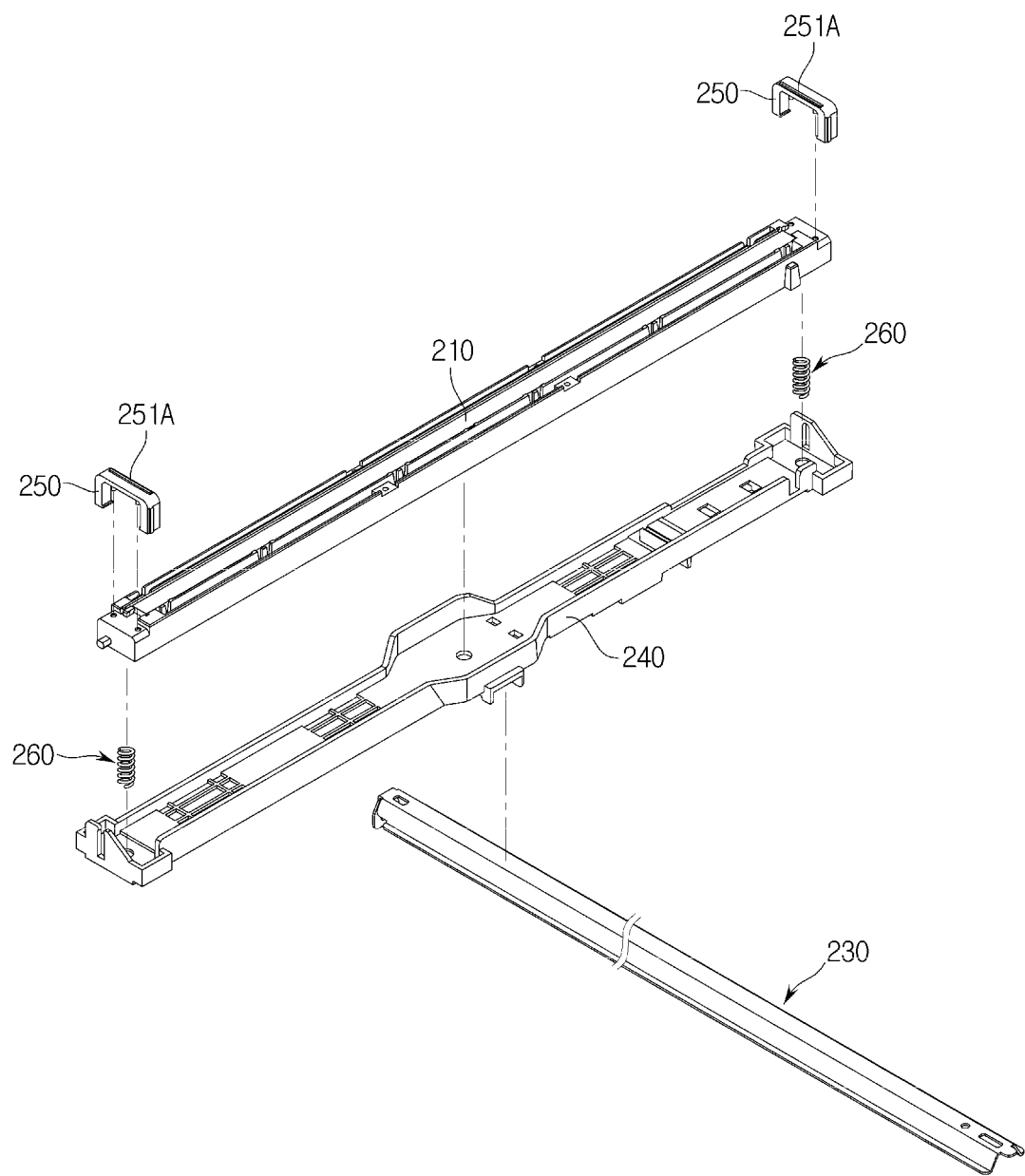
FIG. 3 is an exploded perspective view showing the scanner module applied to the multi-function apparatus according to the embodiment of the present invention.

For example, the scanner module 210 may be a contact image sensor (CIS) type scanner module. To guide movement of the scanner module 210, as shown in FIGS. 2 and 3, a rail 230 to guide movement of the scanner module 210 and a moving member 240, movably installed on the rail 230, at the upper side of which the scanner module 210 is installed are disposed inside the document holder 200.

The scanner module 210 and the moving member 240 may extend in a first direction. For example, with reference to FIG. 2, a front side of the image scanning apparatus 20 may correspond to a side in which a user typically approaches the device to operate the device, for example, where a user interface or control panel may be disposed. The first direction may correspond to or refer to a direction from front to back or from back to front of the image scanning apparatus 20. The rail 230 may extend in a second direction perpendicular to the first direction. For example, the second direction may correspond to or refer to a direction from side to side (e.g., left to right or right to left) of the image scanning apparatus 20. As the moving member 240 moves along the rail 230 in the second direction, the scanner module 210 moves together with the moving member 240 in the second direction to scan a document on the document holder 200.

The document holder 200 may include a rectangular ring-shaped frame 201, a first glass 202 installed at one inner side of the frame 201 such that a document fed by the automatic document feeding unit 220 passes over the upper side of the first glass 202, and a second glass 203 installed at the other inner side of the frame 201 such that a manually supplied document is loaded on the second glass 203. The first glass 202 and the second glass 203 may be formed of a transparent material such that the document loaded on the upper side of the first glass 202 or the second glass 203 is scanned by the scanner module 210 disposed at the lower side of the first glass 202 and the second glass 203. The first glass 202 and the second glass 203 may be spaced apart from each other in the second direction.

Figure 4:
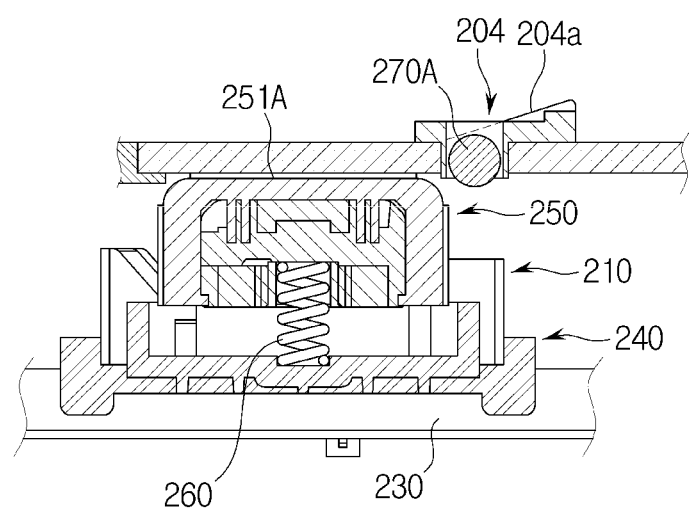
FIGS. 4 to 6 are sectional views showing operation of the scanner module applied to the multi-function apparatus according to the embodiment of the present invention according to movement of the scanner module.
Figure 5:
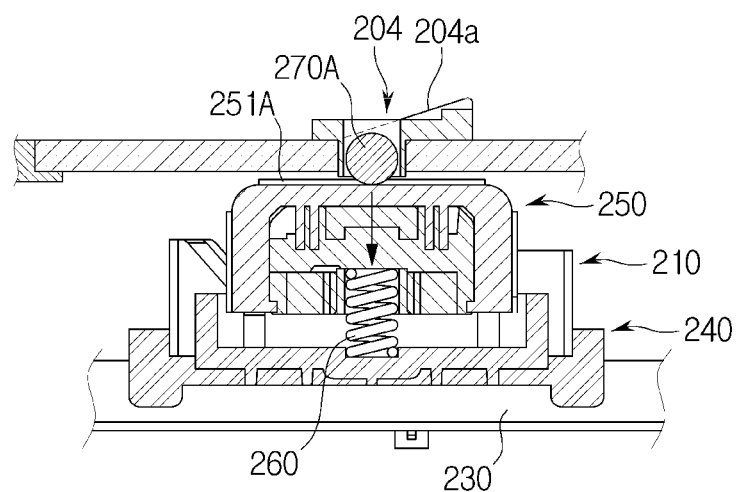
Figure 6:
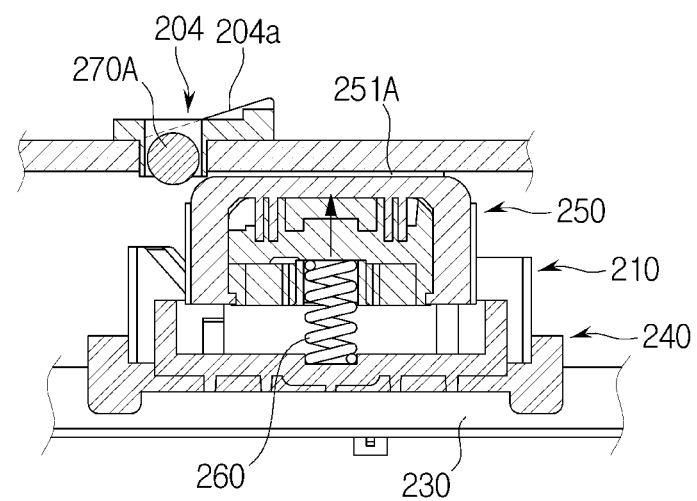

Consequently, the scanner module 210 may scan a document fed by the automatic document feeding unit 220 at the lower side of the first glass 202 while being stopped as shown in FIG. 4 or scan a document loaded on the second glass 203 at the lower side of the first glass 202 while moving in the second direction as shown in FIG. 6. Alternatively, the scanner module 210 may move from the lower side of one of the first glass 202 and the second glass 203 to the lower side of the other as shown in FIG. 5.

Between the first glass 202 and the second glass 203 may be disposed a document guide 204 to guide a document fed by the automatic document feeding unit 220 as shown in FIG. 2. The document guide 204 may include a guide portion 204a protruding upward from the top thereof as shown in FIG. 4. One side of the guide portion 204a may be inclined to guide a document. For example, the guide portion 204a may inclined upward in the second direction.

For example, a CIS type scanner module may be used as the scanner module 210 as previously described. In this type of the scanner module 210, it may be necessary to uniformly maintain the distance between the scanner module 210 and a document to be scanned such that the document is correctly scanned.

To this end, the scanner module 210 may be provided at opposite ends thereof in the first direction with spacers 250 to maintain a predetermined distance between the top of the scanner module 210 and the bottoms of the first glass 202 and the second glass 203 as shown in FIG. 3. An elastic member 260 may be installed between the moving member 240 and the scanner module 210. Consequently, the scanner module 210 is elastically supported by the first glass 202 or second glass 203 side via the spacers 250 in an indirect fashion. The elastic member may be a spring, for example, however the disclosure is not so limited.

Figure 7:
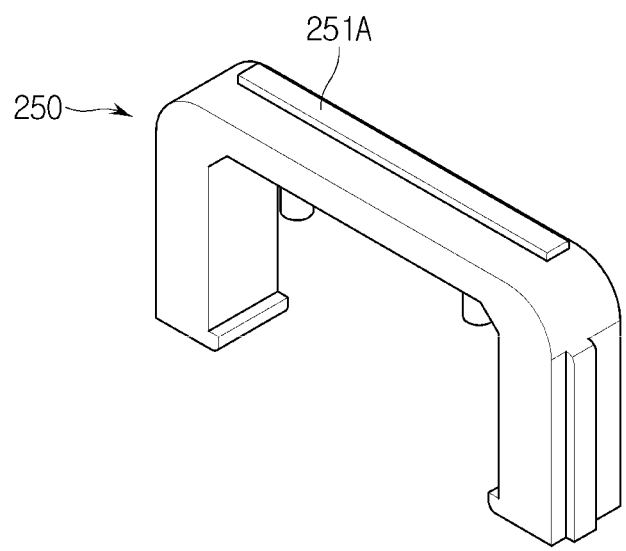
FIG. 7 is a perspective view showing a spacer applied to the multi-function apparatus according to the embodiment of the present invention.
Figure 11:
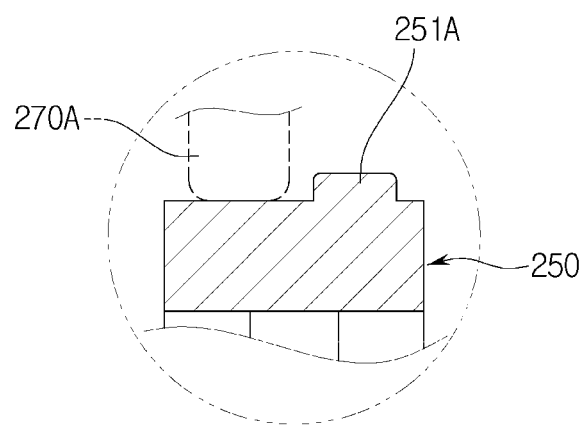
FIG. 11 is a sectional view showing the spacer applied to the multi-function apparatus according to the embodiment of the present invention.

The spacers 250 may be formed of lubricating resin. As shown in FIGS. 7 and 11, each spacer 250 may include a spacer portion 251A protruding upward from the top thereof. The spacer portion 251A may extend to have a predetermined length in the second direction and a predetermined width in the first direction such that the spacer portion 251A comes into surface contact with the first glass 202 or the second glass 203. For example, the spacer may be formed to have substantially upside-down U-shape, including two legs and a bridge portion. Each leg may be separated from one another in the second direction by a predetermined length which may be equal to or greater than the predetermined length of the spacer portion, while the spacer portion may be formed on top of the bridge portion of the spacer. The spacer portion may have a width in the first direction which is equal to or less than the width of the bridge portion of the spacer. There may be one, or more than one spacer portion disposed on the bridge portion of the spacer.

Figure 8:
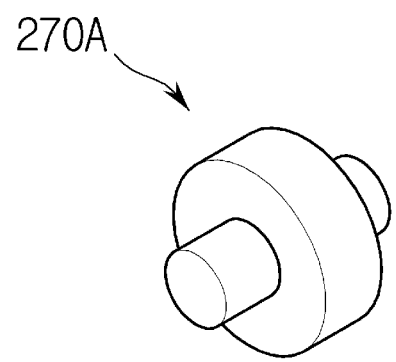
FIG. 8 is a perspective view showing a guide member applied to the multi-function apparatus according to the embodiment of the present invention.

To prevent the spacer portions 251A from being caught by the document guide 204 while the scanner module 210 passes over the lower side of the document guide 204, guide members 270A to guide the respective spacers 250 downward may be disposed between the first glass 202 and the second glass 203 as shown in FIGS. 4 and 8.

The guide members 270A may protrude toward moving routes of the spacers 250 such that the guide members 270A contact the top of the spacers 250 to guide the spacers 250 and the scanner module 210 downward while the scanner module 210 passes over the lower side of the document guide 204. In this embodiment, each spacer portion 251A may be provided at one side of the top of a corresponding one of the spacers 250 in the first direction and each guide member 270A contacts the other side of the top of a corresponding one of the spacers 250 in the first direction. In addition, each guide member 270A may correspond to a roller. Two guide members 270A may be provided to correspond to the two spacers 250 and may be rotatably installed at opposite sides of the document guide 204.

FIG. 4 shows a state in which the scanner module 210 scans a document fed by the automatic document feeding unit 220. As shown in FIG. 4, the scanner module 210 scans the document moved along the top of the first glass 202 by the automatic document feeding unit 220 in a state in which the scanner module 210 is located at the lower side of the first glass 202. In this state, the upper end of the spacer portion 251A may be supported by the first glass 202 such that the scanner module 210 is spaced apart from the first glass 202 by a predetermined distance. For example, the scanner module 210 may be spaced apart from the first glass 202 by a distance corresponding to a height of the spacer portion 251A and a partial or fractional amount of the height of the spacer 250.

FIG. 5 shows a state in which the scanner module 210 passes over the lower side of the document guide 204. As shown in FIG. 5, the spacer 250 and the scanner module 210 are moved downward by the guide member 270A such that the spacer portion 251A is spaced apart from the document guide 204. Since the spacer portion 251A passes over the lower side of the document guide 204 in a state in which the spacer portion 251A is spaced apart from the document guide 204, damage to the spacer portion 251A, which may occur if the spacer portion 251A is caught by the document guide 204, is prevented. For example, as can be seen from FIG. 5, the downward movement caused by the guide member 270A may cause the elastic member 260 to be compressed.

FIG. 6 shows a state in which the scanner module 210 is located at the lower side of the second glass 203 after passing over the document guide 204. As shown in FIG. 6, the spacer 250 and the scanner module 210 may be moved upward by the elastic restoring force of the elastic member 260 such that the upper end of the spacer portion 251A is supported by or in contact with the bottom of the second glass 203. Consequently, the scanner module 210 may be spaced apart from the second glass by a predetermined distance via the spacer portion 251A. For example, the scanner module 210 may be spaced apart from the second glass 203 by a distance corresponding to a height of the spacer portion 251A and a partial or fractional amount of the height of the spacer 250.

Figure 9:
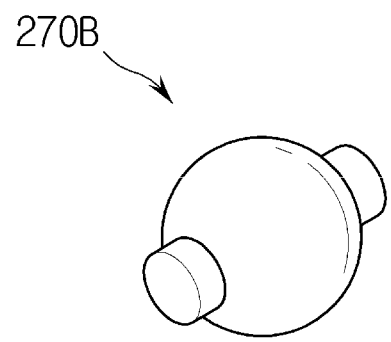
FIG. 9 is a perspective view showing a spacer applied to a multi-function apparatus according to another embodiment of the present invention.
Figure 10:
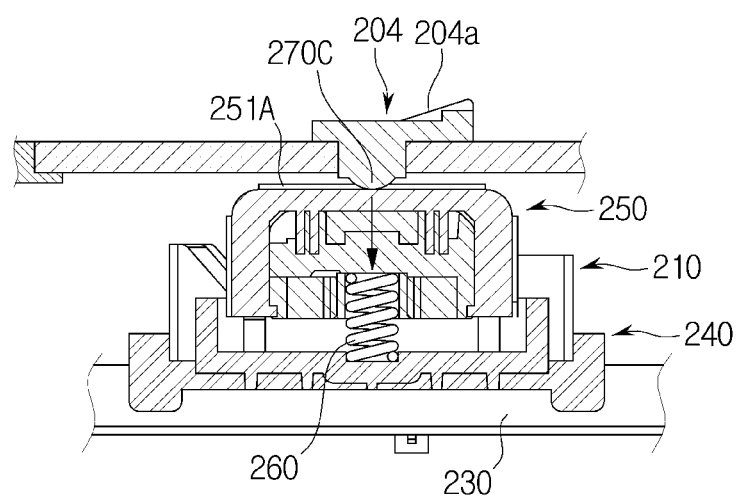
FIG. 10 is a perspective view showing a scanner module and a spacer applied to a multi-function apparatus according to a further embodiment of the present invention.

For example, each guide member 270A may be embodied by or correspond to a roller. However, the example embodiments disclosed herein are not limited thereto. As shown in FIG. 9, a guide member 270B may be embodied by or correspond to a ball coming into point contact with the top of a corresponding one of the spacers 250. Alternatively, a guide member 270C may be embodied by or correspond to a guide protrusion integrally protruding from the bottom of the document guide 204, as shown in FIG. 10 for example.

FIGS. 12 to 15 show various other embodiments of the spacer portion 251A.

Figure 12:
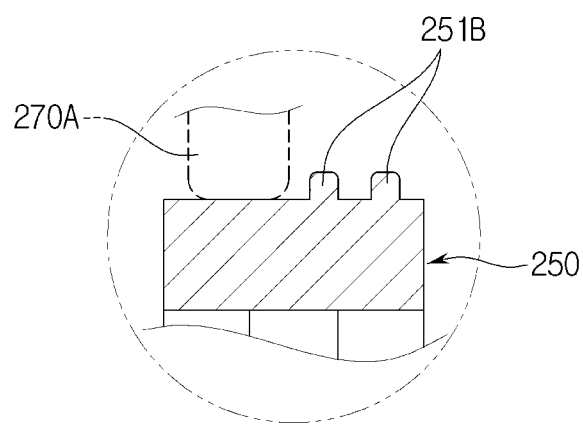
FIGS. 12 to 15 are sectional views showing various embodiments of a spacer to which the present invention is applied.

For example, in FIG. 12, a pair of spacer portions 251B may be disposed at one side of the top of the spacer 250 in the first direction such that the spacer portions 251B are parallel to each other in the second direction. The upper end of each spacer portion 251B may have a predetermined width in the first direction such that each spacer portion 251B comes into surface contact with the first glass 202 or the second glass 203. For example, the guide member 270A may contact the other side of the top of the spacer 250 in the first direction. As shown in FIG. 12, the guide member 270A may be disposed on one side of both spacer portions 251B in the first direction. The spacer portions 251B may have the same width or different widths in the first direction, and may have the same length or different lengths in the second direction.

Figure 13:
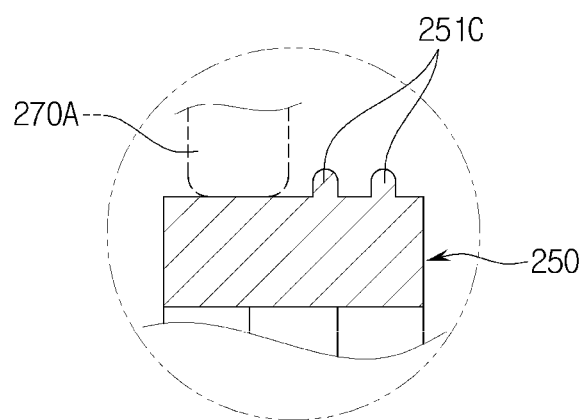

For example, in FIG. 13, a pair of spacer portions 251C may be disposed at one side of the top of the spacer 250 in the first direction such that the spacer portions 251C are parallel to each other in the second direction. The upper end of each spacer portion 251C may be formed in an arc shape such that each spacer portion 251C comes into linear contact with the first glass 202 or the second glass 203. That is, as compared to the spacers 251B of FIG. 12, the spacer portions 251C of FIG. 13 have relatively rounder upper ends, that are substantially semi-circularly shaped. By comparison, the spacer portions 251B have a flatter upper end, though the corners of the upper ends may be rounded. For example, in FIG. 13 the guide member 270A may contact the other side of the top of the spacer 250 in the first direction. As shown in FIG. 13, the guide member 270A may be disposed on one side of both spacer portions 251C in the first direction. The spacer portions 251C may have the same width or different widths in the first direction, and may have the same length or different lengths in the second direction.

Figure 14:
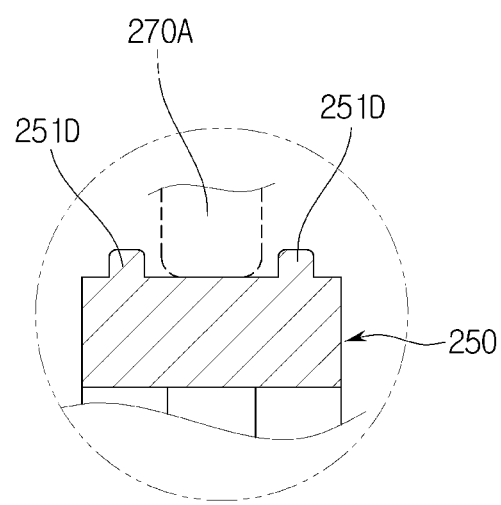

For example, in FIG. 14, a pair of spacer portions 251D may be disposed at opposite sides of the top of the spacer 250 in the first direction such that the spacer portions 251D are parallel to each other in the second direction. The guide member 270A may contact the top of the spacer 250 between the spacer portions 251D. For example, the upper end of each spacer portion 251D may have a predetermined width in the first direction such that each spacer portion 251D comes into surface contact with the first glass 202 or the second glass 203. The spacer portions 251D may have the same width or different widths in the first direction, and may have the same length or different lengths in the second direction.

Figure 15:
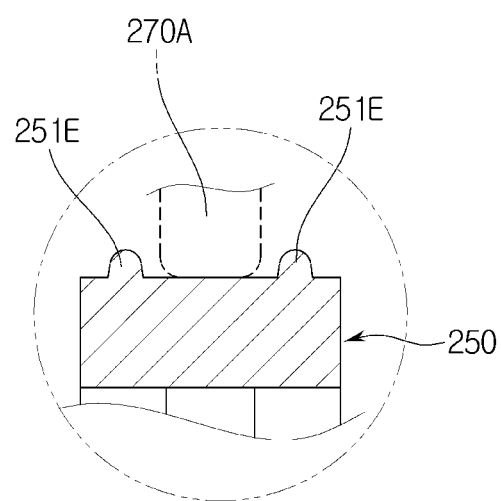

For example, in FIG. 15, the guide member 270A contacts the top of the spacer 250 between two spacer portions 251E. The upper end of each spacer portion 251E may be formed in an arc shape. That is, as compared to the spacers 251C of FIG. 14, the spacer portions 251E of FIG. 15 have relatively rounder upper ends, that are substantially semi-circularly shaped. By comparison, the spacer portions 251D have a flatter upper end, though the corners of the upper ends may be rounded. The spacer portions 251D may have the same width or different widths in the first direction, and may have the same length or different lengths in the second direction.

As is apparent from the above description, the spacers are temporarily moved downward by the respective guide members while the scanner module moves from one of the first and second glasses to the other through the document guide, thereby preventing the spacer portions of the respective spacers from being caught by the document guide and thus preventing damage to the spacer portions.

The image scanning apparatus, multi-function apparatus including the same and operations implemented according to the above-described example embodiments may use one or more processors. For example, a processing device may be implemented using one or more general-purpose or special purpose computers, such as, for example, a processor, a controller and an arithmetic logic unit, a central processing unit (CPU), a graphics processing unit (GPU), a digital signal processor (DSP), a microcomputer, a field programmable array, a programmable logic unit, an application-specific integrated circuit (ASIC), a microprocessor or any other device capable of responding to and executing instructions in a defined manner.

Although example embodiments of the present invention have been shown and described, it would be appreciated by those skilled in the art that changes may be made to these example embodiments without departing from the principles and spirit of the invention, the scope of which is defined in the claims and their equivalents.

What is claimed is:

1. An image scanning apparatus comprising:
    a document holder;
    a scanner module disposed at a lower side of the document holder, the scanner module extending in a first direction, the scanner module capable of moving in a second direction perpendicular to the first direction to scan image information from a document loaded on the document holder;
    an automatic document feeding unit disposed at an upper side of the document holder to automatically feed a document to be scanned; and
    a pair of spacers disposed at opposite sides of the scanner module in the first direction, wherein
    the document holder comprises a first glass and a second glass, the second glass being spaced apart from the first glass in the second direction, and guide members provided between the first glass and the second glass, the guide members protruding toward moving routes of the spacers to guide downward movement of the spacers, and
    at least one spacer of the pair of spacers includes at least one spacer portion protruding from a top thereof such that the spacer portion is supported by a bottom of one of the first and second glasses.

2. The image scanning apparatus according to claim 1, wherein at least one of the spacer portions has an upper end of a predetermined width in the first direction such that the at least one of the spacer portions comes into surface contact with one of the first and second glasses.

3. The image scanning apparatus according to claim 1, wherein at least one of the spacer portions is formed in an arc shape in the first direction such that the at least one of the spacer portions comes into linear contact with one of the first and second glasses.

4. The image scanning apparatus according to claim 1, wherein
at least one of the spacer portions comprises a spacer portion provided at one side of the top of a corresponding spacer in the first direction, and
a corresponding guide member contacts the other side of the top of the corresponding spacer in the second direction.

5. The image scanning apparatus according to claim 1, wherein at least one of the spacers includes a plurality of spacer portions provided in the first direction such that the spacer portions are parallel to each other in the second direction.

6. The image scanning apparatus according to claim 5, wherein
the plurality of spacer portions is provided at one side of the top of a corresponding spacer in the first direction, and
a corresponding guide member contacts the other side of the top of the corresponding spacer in the second direction.

7. The image scanning apparatus according to claim 5, wherein
the plurality of spacer portions is provided at opposite sides of the top of a corresponding spacer in the first direction such that the plurality of spacer portions are spaced apart from each other, and
a corresponding guide member contacts the top of a corresponding spacer between the plurality of spacer portions.

8. The image scanning apparatus according to claim 1, wherein each guide member comprises a roller coming into linear contact with the top of a corresponding spacer.

9. The image scanning apparatus according to claim 1, wherein each guide member comprises a ball coming into point contact with the top of a corresponding spacer.

10. The image scanning apparatus according to claim 1, further comprising:
a document guide disposed between the first glass and the second glass, wherein
at least one guide member comprises a guide protrusion integrally protruding from a bottom of the document guide.

11. The image scanning apparatus according to claim 1, further comprising:
a guide rail extending in the first direction;
a moving member installed at the guide rail such that the moving member moves in the first direction; and
at least one elastic member installed between the scanner module and the moving member.

12. A multi-function apparatus comprising:
an image forming apparatus to form an image; and
an image scanning apparatus disposed on the image forming apparatus to scan image information of a document, wherein
the image scanning apparatus comprises:
a document holder,
a scanner module disposed at a lower side of the document holder, the scanner module extending in a first direction, the scanner module capable of moving in a second direction perpendicular to the first direction to scan image information from a document loaded on the document holder,
an automatic document feeding unit disposed at an upper side of the document holder to automatically feed a document to be scanned, and
a pair of spacers disposed at opposite sides of the scanner module in the first direction,
wherein the document holder comprises a first glass and a second glass, the second glass being spaced apart from the first glass in the second direction, and guide members provided between the first glass and the second glass, the guide members protruding toward moving routes of the spacers to guide downward movement of the spacers, and
at least one spacer of the pair of spacers includes at least one spacer portion protruding from a top thereof such that the spacer portion is supported by a bottom of one of the first and second glasses.

13. The multi-function apparatus according to claim 12, wherein at least one of the spacer portions has an upper end of a predetermined width in the first direction such that the at least one of the spacer portions comes into surface contact with one of the first and second glasses.

14. The multi-function apparatus according to claim 13, wherein at least one of the spacer portions is formed in an arc shape in the first direction such that the at least one of the spacer portions comes into linear contact with one of the first and second glasses.

15. The multi-function apparatus according to claim 12, wherein
at least one of the spacer portions comprises a spacer portion provided at one side of the top of a corresponding spacer in the first direction, and
a corresponding guide member contacts the other side of the top of the corresponding spacer in the second direction.

16. The multi-function apparatus according to claim 12, wherein at least one of the spacers includes a plurality of spacer portions provided in the first direction such that the spacer portions are parallel to each other in the second direction.

17. The multi-function apparatus according to claim 16, wherein
the plurality of spacer portions is provided at one side of the top of a corresponding spacer in the first direction, and
a corresponding guide member contacts the other side of the top of the corresponding spacer in the second direction.

18. The multi-function apparatus according to claim 16, wherein
the plurality of spacer portions is provided at opposite sides of the top of a corresponding spacer in the first direction such that the plurality of spacer portions are spaced apart from each other, and
a corresponding guide member contacts the top of a corresponding spacer between the plurality of spacer portions.

19. The multi-function apparatus according to claim 12, wherein each guide member comprises a roller coming into linear contact with the top of a corresponding spacer.

20. The multi-function apparatus according to claim 12, wherein each guide member comprises a ball coming into point contact with the top of a corresponding spacer.

21. The multi-function apparatus according to claim 12, further comprising:

a document guide disposed between the first glass and the second glass, wherein at least one guide member comprises a guide protrusion integrally protruding from a bottom of the document guide.

22. The multi-function apparatus according to claim 12, further comprising:

a guide rail extending in the first direction;

a moving member installed at the guide rail such that the moving member moves in the first direction; and at least one elastic member installed between the scanner module and the moving member.

23. An image scanning apparatus comprising:

a scanner module disposed beneath a first glass and a second glass disposed adjacent to the first glass, to move between the first glass and second glass in a first direction;

a spacer disposed at an end of the scanner module in a second direction, perpendicular to the first direction, to maintain a predetermined distance between a lower surface of at least one of the first glass and second glass and a top of the scanner module;

a spacer portion disposed at an upper portion of the spacer to support at least one of the first glass and second glass; and a guide member disposed between the first glass and second glass to guide downward movement of the spacer.

24. The image scanning apparatus according to claim 23, further comprising:

a moving member installed on a rail which extends in the first direction, wherein the scanning module is disposed on the moving member which guides movement of the scanning module in the first direction; and an elastic member disposed between the moving member and the scanner module to elastically support the spacer and the scanner module.

25. The image scanning apparatus according to claim 24, wherein the guide member moves the spacer and scanner module downward when the scanner module moves to a position between the first glass and second glass.

26. The image scanning apparatus according to claim 25, wherein the elastic member is adapted to move the spacer and scanning module upward by an elastic restoring force, after the scanner module moves from a position beneath one of the first glass and the second glass to a position beneath the other one of the first glass and the second glass.

27. The image scanning apparatus according to claim 23, wherein the spacer is formed of lubricating resin.

* * * * *

UNITED STATES PATENT AND TRADEMARK OFFICE
CERTIFICATE OF CORRECTION

PATENT NO. : 9,088,687 B2
APPLICATION NO. : 14/186682
DATED : July 21, 2015
INVENTOR(S) : Jin Gu Kang et al.

It is certified that error appears in the above-identified patent and that said Letters Patent is hereby corrected as shown below:

Title Page

Item (57) Abstract, Line 2

Delete "holder," and insert --holder.--, therefor.

Signed and Sealed this
First Day of December, 2015

Michelle K. Lee
*Director of the United States Patent and Trademark Office*